(12) United States Patent
Eckert

(10) Patent No.: US 7,944,102 B2
(45) Date of Patent: May 17, 2011

(54) ELECTRICAL MACHINE WITH MAGNETIC BRAKE DIRECTLY ON THE ROTOR

(75) Inventor: Frank Eckert, Hausen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/273,095

(22) Filed: Nov. 18, 2008

(65) Prior Publication Data

US 2009/0127950 A1 May 21, 2009

(30) Foreign Application Priority Data

Nov. 19, 2007 (EP) .................................... 07022399

(51) Int. Cl.
*H02K 7/10* (2006.01)
*H02K 49/00* (2006.01)
(52) U.S. Cl. ............. 310/77; 310/75 R; 310/76; 310/78; 310/93
(58) Field of Classification Search .................... 310/77, 310/93, 75 R, 76, 78
See application file for complete search history.

(56) References Cited

U.S. PATENT DOCUMENTS

| | | | | |
|---|---|---|---|---|
| 2,489,365 A | * | 11/1949 | Broussouse | 310/77 |
| 4,643,282 A | * | 2/1987 | Edl | 192/18 B |

FOREIGN PATENT DOCUMENTS

| | | | |
|---|---|---|---|
| EP | 0005212 A1 | * | 11/1979 |
| EP | 1 564 868 A1 | | 8/2005 |
| EP | 1564868 A1 | * | 8/2005 |
| JP | 08266009 A | * | 10/1996 |
| JP | 9 028056 A | | 1/1997 |
| JP | 2005 080329 A | | 3/2005 |

OTHER PUBLICATIONS

Machine Translation EP1564868 A1 (2005).*
Machine Translation JP08266009 (1996).*
Machine Translation EP0005212 (1979).*

* cited by examiner

*Primary Examiner* — Quyen Leung
*Assistant Examiner* — Jose A Gonzalez Quinones
(74) *Attorney, Agent, or Firm* — Henry M. Feiereisen; Ursula B. Day

(57) ABSTRACT

An electrical machine includes a stator having circumferentially arranged winding heads, with a winding head space being defined radially beneath the winding heads. Interacting with the stator is a rotor which has a rotatable laminated core. A magnetic brake is received in the winding head space and includes a magnet module having at least one permanent magnet which is axially resiliently fixed and constraint against rotation and which is magnetized in an axial direction, and an electromagnet which is arranged axially adjacent to the permanent magnet and securely fixed thereto. The electromagnet produces a magnetic field with a main direction oriented in an axial direction. Interacting with the at least one permanent magnet and the electromagnet is a ring-shaped armature which is secured directly and rigidly to the rotor so as to establish a fixed rotative engagement between the armature and the rotor.

8 Claims, 2 Drawing Sheets

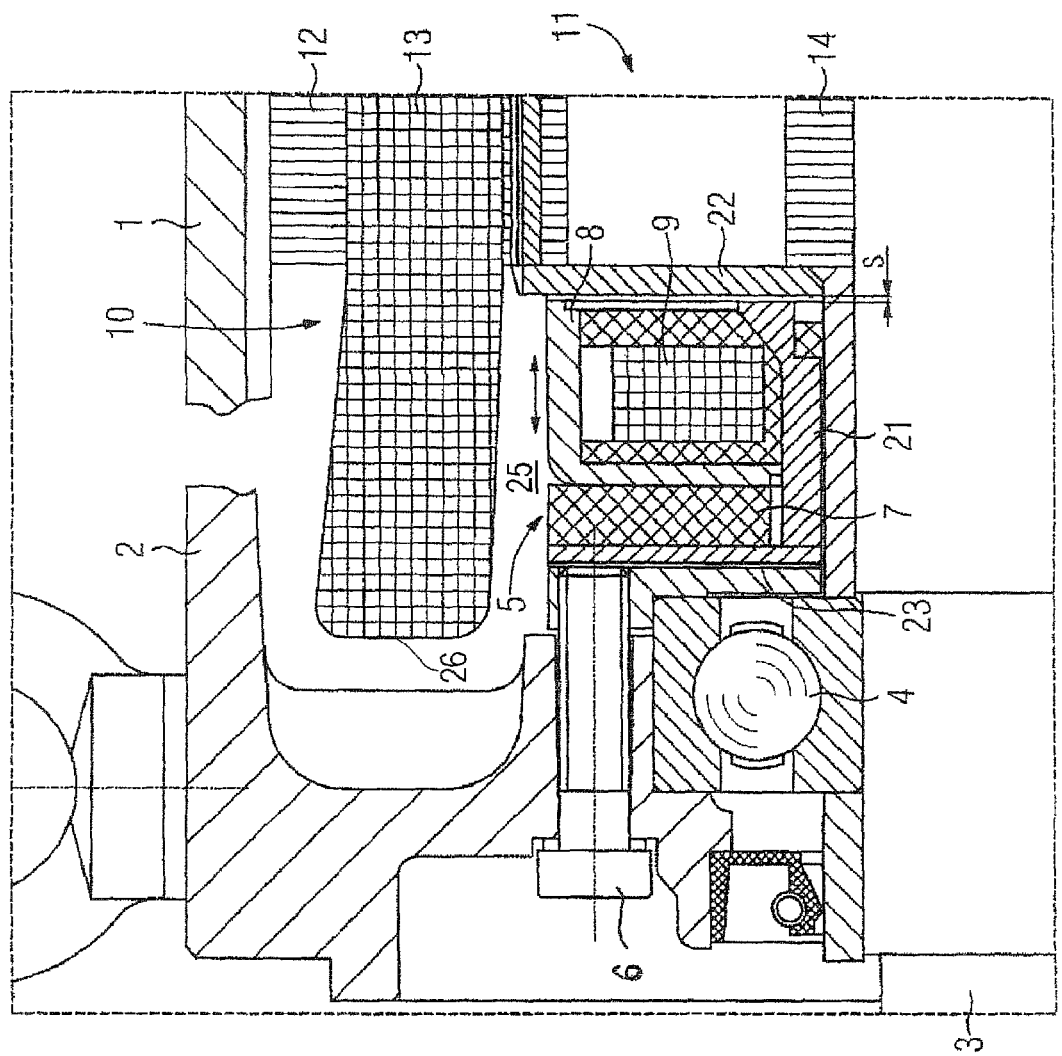

ELECTRICAL MACHINE WITH MAGNETIC BRAKE DIRECTLY ON THE ROTOR

CROSS-REFERENCES TO RELATED APPLICATIONS

This application claims the priority of European Patent Application, Serial No. 07022399, filed Nov. 19, 2007, pursuant to 35 U.S.C. 119(a)-(d), the content of which is incorporated herein by reference in its entirety as if fully set forth herein.

BACKGROUND OF THE INVENTION

The present invention relates in general to the field of electric machines.

An electrical machine of a type involved here includes a housing or stator, a rotor which has a laminated core and which is rotatably mounted in the housing, and a magnetic brake. For its part, the magnetic brake has at least one permanent magnet which is fixed to the housing or stator so that it cannot rotate and is magnetized in an axial direction, an electromagnet which is arranged so that it is connected axially to the permanent magnet and is securely fixed thereto, and a ring-shaped armature which is fixed to the rotor so that it cannot rotate and acts together with the two magnets, wherein the main direction of the magnetic field of the electromagnet likewise runs in an axial direction.

Permanent magnet excited integral brakes, i.e. magnetic brakes, for electric motors usually consist of a permanent magnet and an electromagnet which act together with an armature. The electromagnet or coil body usually constitutes a stator part, while as a rule the armature is realized as the rotor part.

For functional reasons, the rotor part typically has an axially resilient magnetic steel armature and a carrier flange which is usually amagnetic. This multi-part construction results in an additional overall length of the electric motor. In addition, the costs for the components and for assembling the rotor part are high. Finally, the high inertia due to the solid steel armature adversely affects the dynamics of the electrical machine (e.g. servomotor).

It would therefore be desirable and advantageous to provide an improved electrical machine to obviate prior art shortcomings and to include an integral brake which is as small and as cost effectively as possible, and yet ensures high dynamics of the electrical machine.

SUMMARY OF THE INVENTION

According to one aspect of the present invention, an electrical machine includes a stator having circumferentially arranged winding heads, with a winding head space being defined radially beneath the winding heads, a rotor interacting with the stator and having a rotatable laminated core, and a magnetic brake received in the winding head space and including a magnet module having at least one permanent magnet which is axially resiliently fixed and constraint against rotation and which is magnetized in an axial direction, and an electromagnet which is arranged axially adjacent to the permanent magnet and securely fixed thereto, with the electromagnet producing a magnetic field with a main direction oriented in an axial direction, and a ring-shaped armature which interacts with the at least one permanent magnet and the electromagnet and is secured directly and rigidly to the rotor so as to establish a fixed rotative engagement between the armature and the rotor.

The present invention resolves prior art problems by allowing the magnet module (electromagnet and permanent magnet) to move axially in its entirety and directly securing the armature to the rotor or laminated rotor core. As a result, the need for additional components, such as a carrier flange, can be eliminated, thereby not only reducing component costs and the number of components but also the inertia of the rotor. Furthermore, the electrical machine can be built axially shorter.

According to another advantageous feature of the present invention, the at least one permanent magnet may be axially resiliently fixed to the stator.

According to another advantageous feature of the present invention, a housing may be provided for accommodating the stator and the rotor, with the at least one permanent magnet being axially resiliently fixed to the housing.

According to another advantageous feature of the present invention, the ring-shaped armature may simultaneously constitute an end plate of the laminated core of the rotor. This multifunctionality likewise enables an additional component to be saved and the rotor inertia to be reduced.

According to another advantageous feature of the present invention, the electromagnet can be connected in such a way that current passes through the electromagnet and an active part of the electrical machine so as to substantially compensate the magnetic force of the permanent magnet. This allows the integral brake to be used as a holding brake when no current flows through the electrical machine, and the permanent magnet then attracts the armature with a braking action.

According to another advantageous feature of the present invention, a segmented leaf spring or ring spring may be arranged between the housing or stator and the magnet module to allow a predefined movement of the magnet module in axial direction relative to the housing or stator and transmit a braking torque from the magnet module onto the housing or stator. The leaf or ring spring thereby fulfils several requirements, namely that of axial mobility of the magnet module, and the transmission of torque to the housing or stator, either directly or, for example, indirectly via a frame to the housing.

The electrical machine has a stator with windings, wherein the magnetic brake can be received in its entirety in the winding head space. This is possible particularly because of the absence of a carrier flange. As a result, the electrical machine can be constructed much shorter in axial direction and thus very compact.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 shows a section through part of another embodiment of an electrical machine.

DETAILED DESCRIPTION OF PREFERRED EMBODIMENTS

Figure 1:
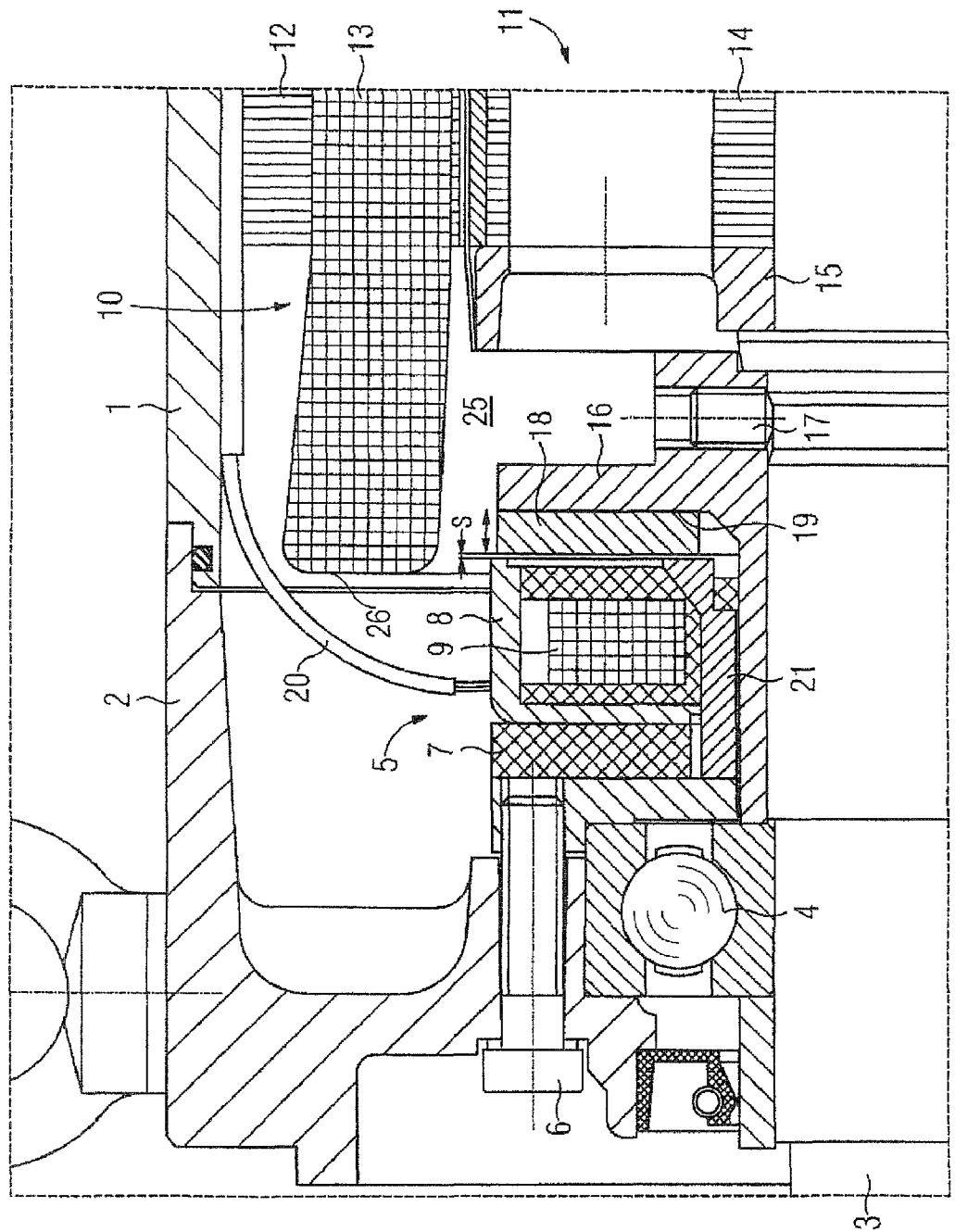
FIG. 1 shows a section through part of one embodiment of an electrical machine.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an embodiment of an electric motor having a housing 1 and a bearing shield 2 fixed thereto. When the electric motor has no housing, the bearing shield is normally fixed to the stator. A shaft 3 is rotatably mounted in the bearing shield with the help of a rotating bearing 4. A magnet module 5 of an integral brake (magnetic brake) is rigidly fixed to the bearing shield 2 with the help of a screw 6. The magnet module 5 comprises a ring-shaped permanent magnet 7, if necessary also a plurality of permanent magnets, and a coil 9 arranged in an angled core 8. In doing so, the components are arranged axially immediately behind one another as follows: permanent magnet 7, a leg of the angled core 8 and coil 9.

The electric motor has two active parts, namely the stator 10 and the rotor 11. For its part, the stator 10 has a laminated core 12 and winding heads 13 protruding axially therefrom and terminating in an axial outer face 26 end extending in perpendicular relationship to the shaft 3. The winding heads 13 are arranged circumferentially enabling a "winding head space", designated by reference numeral 25 to be defined inside them, i.e. radially beneath them for the purposes of the present embodiments.

The rotor 11 has a laminated core 14 and an end plate 15 which are both arranged on the shaft 3 so that they cannot rotate. A carrier flange 16, which is clamped to the shaft 3 with the help of a clamping screw 17 so that it cannot rotate, is located between the end plate 15 of the rotor 11 and the coil 9 or the angled core 8 of the magnet module 5. A ring-shaped steel armature 18 is fixed to the carrier flange 16 with the help of a segmented leaf or ring spring (not shown in FIG. 1) so that it cannot rotate. The steel armature 18 is therefore resiliently connected axially in the slot 19 to the carrier flange 16, which is usually amagnetic.

During operation, i.e. when current is passed through the stator 10, current also passes through the coil 9, which is shown by the conductor 20. In this case, the electromagnet, i.e. the coil 9, produces a magnetic field which opposes the magnetic field of the permanent magnet 7. Consequently, the magnet module 5 does not attract the steel armature 18 and the leaf or ring spring in the slot 19 pulls the steel armature 18 against the carrier flange 16 so that a gap S is produced between the angled core 8, or a mounting part 21 which faces the shaft 3, and the steel armature 18.

Otherwise, when the current is switched off and no current passes through either the stator 10 or the coil 9, the magnetic field of the permanent magnet 7 transmitted via the angled core 8 and the mounting part 21 causes the steel armature 18 to be magnetically attracted against the force of the leaf or ring spring. This results in a friction force between the angled core 8 and the mounting part 21 on the one hand and the steel armature 18 on the other. The appropriate torque is transmitted from the carrier flange 16 via the leaf or ring spring in the slot 19. As a result, the rotor 11 is braked and/or held. When the brake is lifted, that is when current flows through the coil 9, the steel armature 18 separates from the magnet module 5 once more so that the air gap S is reinstated.

The disadvantage of this design is the presence of a solid carrier flange 16 which has the function of a hub and has a high moment of inertia. Furthermore, it has a significant axial length so that the integral brake has to be arranged axially outside the winding head space 25.

Turning now to FIG. 2, there is shown a section through part of a currently preferred embodiment of an electrical motor in accordance with the present invention. Parts corresponding with those in FIG. 1 are denoted by identical reference numerals and not explained again. The description below will center on the differences between the embodiments. In this embodiment, provision is made for a rotor 11 having a laminated core 14 and a ring-shaped steel armature 22 as an end plate. Alternatively, the steel armature 22 can also be mounted directly on the face of the rotor 11 without carrying out the function of an end plate. The magnet module 5, comprised of the permanent magnet 7, the coil 9, the angled core 8 and the mounting part 21, interacts with the steel armature 22, with the magnet module 5 being resiliently fixed to the bearing shield 2 or the housing 1 with the help of a segmented leaf or ring spring in the slot 23. As a result, the magnet module 5 can move axially. Thus, as opposed to the electrical machine of FIG. 1 in which the steel armature moves, the magnet module 5 can now move axially to a certain extent, as indicated by the double arrow in FIG. 2.

During operation, i.e. when current is applied to the stator 10 and the coil 9, the magnetic field of the permanent magnet 7 is cancelled out so that magnet module 5 and steel armature 22 do not attract one another. This results in the formation of a gap S between the magnet module 5 and the steel armature 22. In this state, the leaf or ring spring pulls the magnet module 5 in FIG. 2 to the left, i.e. away from the rotor 11 toward the bearing shield 2.

If no current is applied to the stator 10 and the coil 9, the magnetic field of the permanent magnet 7 is decisive so that the magnet module 5 and the steel armature 22 attract one another. The air gap S is reduced to zero in opposition to the force of the leaf or ring spring, and the rotor 11 is held and/or braked by friction on the magnet module 5. The resulting braking force is transmitted by the leaf or ring spring on the magnet module 5 to the bearing shield 2 or to a mounting ring fixed thereto, wherein the gap 23, in which the leaf or ring spring is located, between the magnet module 5 and the bearing shield 2 or the mounting component, opens slightly. The magnet module 5 is therefore axially resiliently connected to the bearing shield 2.

According to the present invention, the need for an amagnetic hub (carrier flange 16) on the rotor 11 or shaft 3 can be eliminated as well as the need for a segmented leaf or ring spring on the rotor 11. This reduces inertia of the rotor of the electric motor which is beneficial particularly in dynamic operation, for example in the case of servomotors (the leaf or ring spring is mounted on the housing without affecting the inertia of the rotor). Saving the hub, the associated reduction in components and the resulting reduced assembly effort advantageously also enables a cost saving to be achieved. However, the shorter fitting space for the magnetic brake due to dispensing with the hub is particularly advantageous. It can be accommodated completely within the winding head space 25, i.e. it does not protrude from the winding head arrangement either axially or radially. In other words, the magnetic brake is received in its entirety inwardly of the outer face end 26 of the winding heads 13 within the winding head space 25. Overall, a more compact construction of the motor or the electrical machine is therefore possible.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electrical machine, comprising:
    a stator having circumferentially arranged winding heads, with a winding head space being defined radially beneath the winding heads;
    a rotor interacting with the stator and having a rotatable laminated core which is arranged on a shaft, said winding heads of the stator having an outer face end extending in a perpendicular relationship to the shaft; and
    a magnetic brake received in its entirety inwardly of the outer face end of the winding heads within the winding head space and including
        a magnet module having at least one permanent magnet which is constraint against rotation and which is magnetized in an axial direction, and an electromagnet which is arranged axially adjacent to the permanent magnet and securely fixed thereto, with the electromagnet producing a magnetic field with a main direction oriented in an axial direction, and
        a ring-shaped armature which interacts with the at least one permanent magnet and the electromagnet and is secured directly and rigidly to the rotor so as to establish a fixed rotative engagement between the armature and the rotor,
        wherein the magnet module is movable in an axial direction between a first position in which current is applied so that the magnet module and the armature are not attracted to one another in the absence of a braking action, and a second position in which no current is applied so that the magnet module and the armature are attracted to one another in the presence of a braking action.

2. The electrical machine of claim 1, wherein the at least one permanent magnet is axially resiliently fixed to the stator.

3. The electrical machine of claim 1, further comprising a housing for accommodating the stator and the rotor, said at least one permanent magnet being axially resiliently fixed to the housing.

4. The electrical machine of claim 1, wherein the magnetic brake is received in its entirety in the winding head space.

5. The electrical machine of claim 1, wherein the ring-shaped armature constitutes an end plate of the laminated core of the rotor.

6. The electrical machine of claim 1, wherein the electromagnet is connected in such a way that current passes through the electromagnet and an active part of the electrical machine so as to substantially compensate the magnetic force of the permanent magnet.

7. The electrical machine of claim 1, further comprising a segmented leaf spring or ring spring arranged between the stator and the magnet module to allow the predefined movement of the magnet module in axial direction.

8. The electrical machine of claim 1, wherein the stator has a laminated core defined by an end face substantially in alignment with an end face of the laminated core of the rotor.

* * * * *